United States Patent
Konstantin

[15] 3,656,636
[45] Apr. 18, 1972

[54] SYSTEM AND APPARATUS FOR AUTOMATICALLY COLLECTING, SORTING AND DISTRIBUTING ARTICLES FROM ONE OR MORE LOCATIONS TO ONE OR MORE LOCATIONS

[72] Inventor: William N. Konstantin, Norwalk, Conn.
[73] Assignee: Product Design Corporation, Norwalk, Conn.
[22] Filed: Nov. 24, 1969
[21] Appl. No.: 870,564

[52] U.S. Cl..........................................214/8.5 F, 198/156
[51] Int. Cl.......................................................B65g 59/06
[58] Field of Search............214/8.5 A, 8.5 G, 8.5 R, 16.14 E, 214/38.44, 8.5 F; 198/219, 156, 157, 35

[56] References Cited

UNITED STATES PATENTS

| | | | |
|---|---|---|---|
| 614,640 | 11/1898 | Wheeler | 198/157 |
| 718,745 | 1/1903 | Winant | 198/157 X |
| 1,192,561 | 7/1916 | Reiser | 198/35 UX |
| 2,461,308 | 2/1949 | Brown | 198/157 X |
| 2,872,020 | 2/1959 | Hansel et al. | 198/35 |

Primary Examiner—Gerald M. Forlenza
Assistant Examiner—George F. Abraham
Attorney—Robertson, Bryan, Parmelee & Johnson

[57] ABSTRACT

System and apparatus for automatically collecting, sorting and distributing articles from one or more locations to one or more locations are described wherein a conveyor system gathers selected articles located at supply stations and automatically transports these articles to delivery stations. The conveyor system incorporates main and side tracks with continuously driven carriers moving along the tracks. Article supply and delivery stations are associated with respective side tracks and the carriers are selectively routed onto the side tracks with system-controlled track switches, the data for controlling the switches is advantageously shown as being transmitted by the respective carriers themselves. A drive mechanism in the form of a continuous chain is coupled to the carriers by means of a drive link which is pivotably coupled from the drive chain to the carriers with the orientation of the link relative to the drive chain being controlled for speed control of the carriers at the respective article handling stations. Meshing engagement of article carriers with the article supply and delivery stations assures a rapid article handling system. Various system configurations are disclosed.

16 Claims, 18 Drawing Figures

Fig. 3

SYSTEM AND APPARATUS FOR AUTOMATICALLY COLLECTING, SORTING AND DISTRIBUTING ARTICLES FROM ONE OR MORE LOCATIONS TO ONE OR MORE LOCATIONS

DESCRIPTION

This invention relates to system and apparatus for automatically collecting, sorting and distributing articles from one or more locations to one or more locations. More specifically this invention relates to an automatic conveyor system for fetching different articles at respective supply stations for collection at one or more delivery stations.

In the prior art filling of orders for numerous different merchandise articles, for instance, at a distributor, a significant percentage of the articles picked out by the personnel is often found to be in error. The erroneous filling of orders involves a large expense and great administrative inconvenience to the distributor, for the erroneous articles are returned by the retailers. With the relatively large number of choices available for any particular desired commodity in a modern economy, a burden is imposed on distributors and manufacturers to fill these orders in an accurate expeditious manner.

In fact, whenever a large number of different items are to be collected at a location, the chances for collecting wrong items increase to a level where extensive and elaborate administrative efforts are needed to correct mistakes and assure a reliable collection system.

In a conveyor system and apparatus in accordance with the invention different preselected types of articles are collected at a delivery station in an automatic and accurate manner.

A conveyor system in accordance with the invention employs carriages running on tracks which are operatively associated with and pass near various article supply and delivery stations. Side track branches are provided and extend from maintracks towards stations where desired articles are positioned for quick and easy removal. Desired articles are automatically and carefully picked up by article carriers routed onto the side tracks and transported to a delivery station where the articles are quickly and automatically removed from carriers. The carriers move along the tracks under drive action by a continuously moving drive selectively spaced from the tracks. Drive links are connected in a pivotable manner to each of the carriers, and they drive, and control motion of carriers along main and side tracks to assure a careful handling of articles at the several stations.

An advantage of the conveyor system in accordance with the invention resides in the ability to accumulate a variety of different commodities at a delivery station in an automatic and accurate manner.

The speed of the carriers along the tracks essentially may be as fast as desired with substantial speed reductions obtainable with link toggling operations opposite article supply and delivery stations. This speed control is obtained by selectively spacing carriers from the drive with track or drive displacements. This selective spacing of carriers provides an advantageous high speed article collection system capable of supplying many different articles at a delivery station in a short time.

The various automatic conveyor systems described can also be used to advantage for accomplishing distribution of predetermined articles to predetermined destinations or delivery stations. For example, they can be used to distribute raw material items to pre-selected production stations in a manufacturing plant.

Another function which can be performed is that of sorting out a multiplicity of articles so as to delivery them to predetermined destinations.

These advantages and others of the conveyor system in accordance with the invention may be appreciated upon a review of a description of a preferred embodiment of the invention in conjunction with the drawings wherein:

Figure 1:
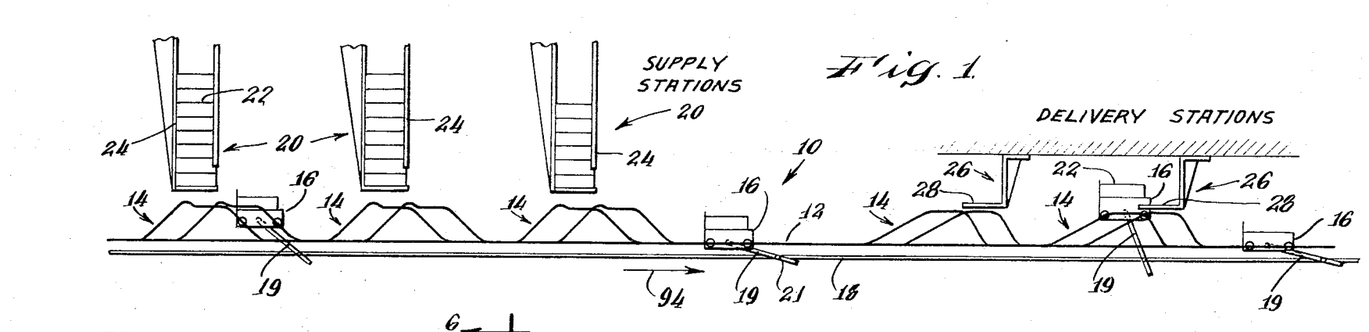
FIG. 1 is a partial schematic view of a horizontally disposed conveyor system in accordance with the invention.

With reference to the FIG. 1, an article conveyor system 10 is shown for collecting a number of different articles. Conveyor system 10 is formed of a horizontally disposed main track 12 a plurality of side tracks 14, article carriers 16 located on the tracks and moved therealong by a drive mechanism 18 in the form of a drive chain selectively spaced from the tracks. Drive links 19 interconnect carriers 16 to drive mechanism 18. Several article supply stations 20 are shown located generally opposite side tracks 14. The supply stations are provided with stacked articles 22 located in chutes 24 shaped to permit automatic removal of an article 22 by a carrier 16 moving along a side track 14. Carriers running along main tracks 12 may bypass supply stations 20. Article delivery stations 26 are shown located opposite side tracks 14. The number of supply stations 20 and delivery or collection stations 26 may be as desired with the presentation in FIG. 1 illustrative of the versatility of the system.

Carriers 16 are horizontally mounted to roll along the tracks as will be further described and may be directed onto side tracks 14 by remotely controlled track switches. In the system which is shown herein as being illustrative of the present invention, the track switches are advantageously controlled by control data transmitted by the respective carriers themselves. Control means in the form of magnetizable plaques mounted on the respective carriers are scanned by sensing units preceding each of the switches, as will be explained in greater detail further below.

Carriers 16 as illustrated in the FIG. 1 selectively are pushed or pulled along the tracks by links 19 pivotably mounted to both the carriers and drive 18. The drive mechanism is a chain running along main track 12 and moving under action by motors (not shown). The conveyor system is a closed loop in the sense that main tracks 12 close upon themselves so that carriers 16 may continually pick up articles at supply stations for collection and unloading at delivery stations. Each chute 24 is adjusted or selected to accommodate a particular type of article which may be characterized by its cost, size, shape or other definable features. In some instances a chute may contain groups of articles conveniently prepackaged in a box. The articles located in the chutes are automatically removable by carriers only when a carrier is moving along a side track 14. Each delivery station 26 is provided with an article removal device 28. Side tracks 14 are selectively spaced from drive means 18 at a distance whereby link pivoting preserves employment of a common drive 18 while carriers are routed onto side tracks.

Figures 4, 8:
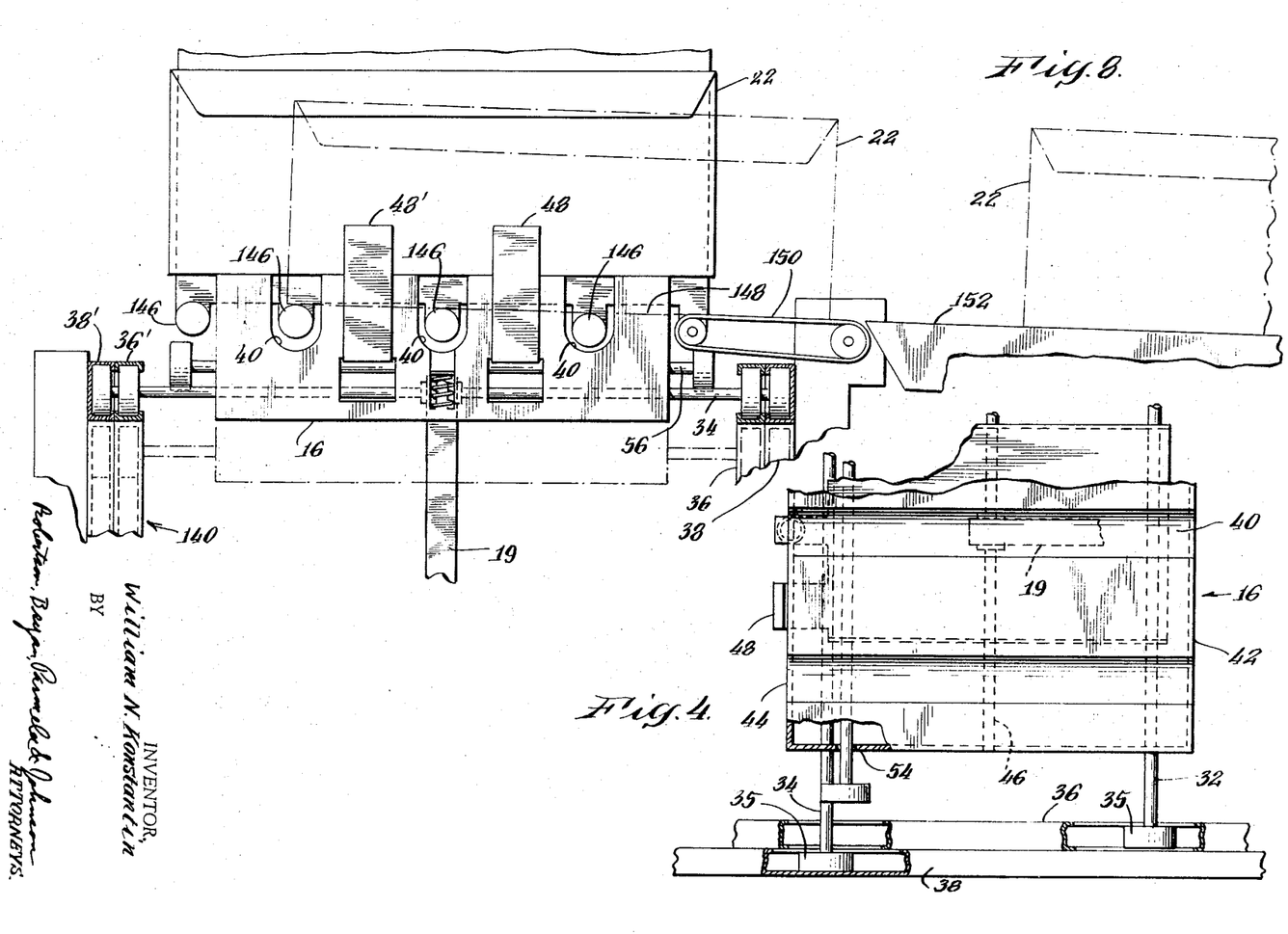
FIG. 4 is a broken top view of a carrier in position along main tracks illustrating the use of separate adjacent tracks for front and rear wheels of a carrier.
FIG. 8 is a rear view of a carrier operatively located to unload an article at a delivery station with the rear view taken along the line 8—8 in FIG. 7.
Figures 5, 6:
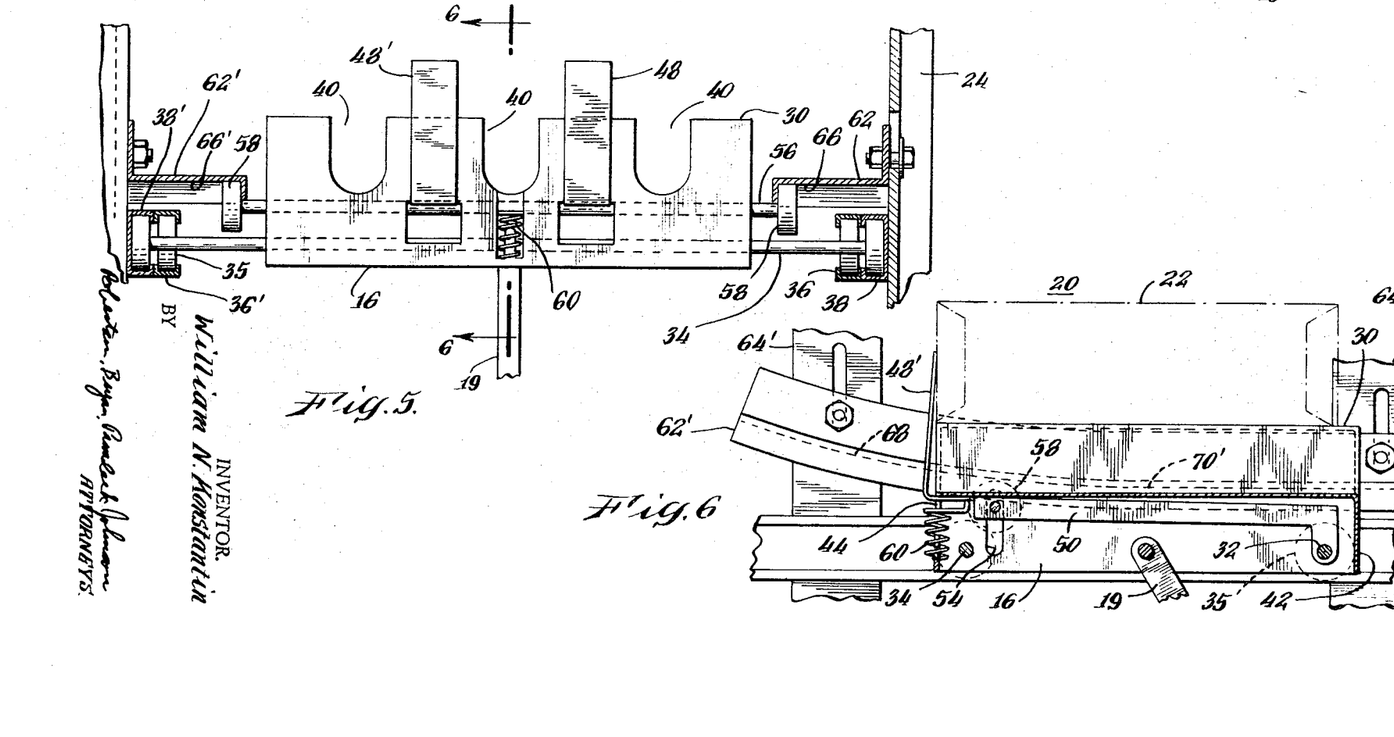
FIG. 5 is an end view of a carrier illustrating an article snaring device mounted thereon to remove an article from a stack at a supply station.
FIG. 6 is a section view of a carrier utilizing the article snaring device of FIG. 5 as taken along the lines 6—6 in FIG. 5.

Each carrier 16 as illustrated in FIGS. 4, 5 and 6 is formed of a slotted article carrier platform 30 supported by front and rear axles 32-34 respectively. The ends of axles 32-34 are provided with wheels 35 sized to move in front wheel channels 36-36' and rear wheel channels 38-38'. The tracks are formed of pairs of side located channels 36-38, 36-38' (only 36-38 being visible in the view of FIG. 4). Front wheels roll along inner front channels 36-36' and rear wheels roll in outer rear channels 38-38'. Channels such as 36-38 are mounted to one another in a horizontally disposed conveyor system as in FIG. 1 whereas the inclined and vertical conveyor systems shown in FIGS. 10 and 11 respectively employ a spacing between all channels selected to maintain carrier article platforms horizontally disposed.

The carrier platform 30 is provided with longitudinal recesses or slots such as 40 oriented parallel with the direction of track motion of carriers. Slots such as 40 extend to a sufficient depth below platform 30 to receive meshing fingers at article supply and delivery stations. Recesses 40 further span the length of platform 30 to permit below platform end insertion of a meshing finger at the front end 42 of carrier 16 and below platform removal of meshing fingers at rear end 44 of carrier 16.

Each carrier 16 is connected with a drive link 19 to the chain drive 18. Drive link 19 is connected pivotly to carrier 16 at a pivot shaft 46 located generally midway between axles 32-34 and oriented parallel therewith. Each carrier 16 is further provided at its rear end 44 with article removal mechanism in the form of upright extending article snaring arms 48. Arms 48 are vertically movably mounted to carrier 16.

Each arm 48 extends upright from horizontally disposed levers 50 (See FIG. 6) pivotly mounted to the carrier 16 with horizontally disposed shaft 32. At an end of lever 50 away from shaft 32 carrier 16 is provided with side located vertically oriented slots 54. As shown in FIG. 5 two arms 48-48' are provided and joined to one another by a horizontally disposed shaft 56 extending through slots 54 in opposite sides of carrier 16. Shaft 56 is provided at its ends with rollers 58. A compressed spring 60 located between shaft 56 and a bottom flange on carrier 16 biases shaft 56, and thus also arms 48-48', in an upward position.

Vertically adjustable cam brackets 62-62' are provided on opposite sides of carrier 16 and mounted to suitable brackets 64-64' at supply station 20. Cam brackets 62-62' are each provided with a roller contacting cam surface 66-66' respectively. Cam surfaces 66-66' are each formed of a curved gradually downwardly sloping portion 68 and a horizontally disposed arm height determining portion 70. Cam brackets 62-62' are so located relative to supply station 20 that horizontally disposed arm height determining portion 70-70' are in contact with rollers 58 just before arms 48 contact articles 22 at supply station 20. In this manner arms 48 are at the proper height for the removal of a single or preselected number of articles from station 20. Cam surface portions 70-70' further extend along station 20 to maintain arms 48 at the selected article pick off level until departure of carrier 16 from the supply station.

Figure 2:
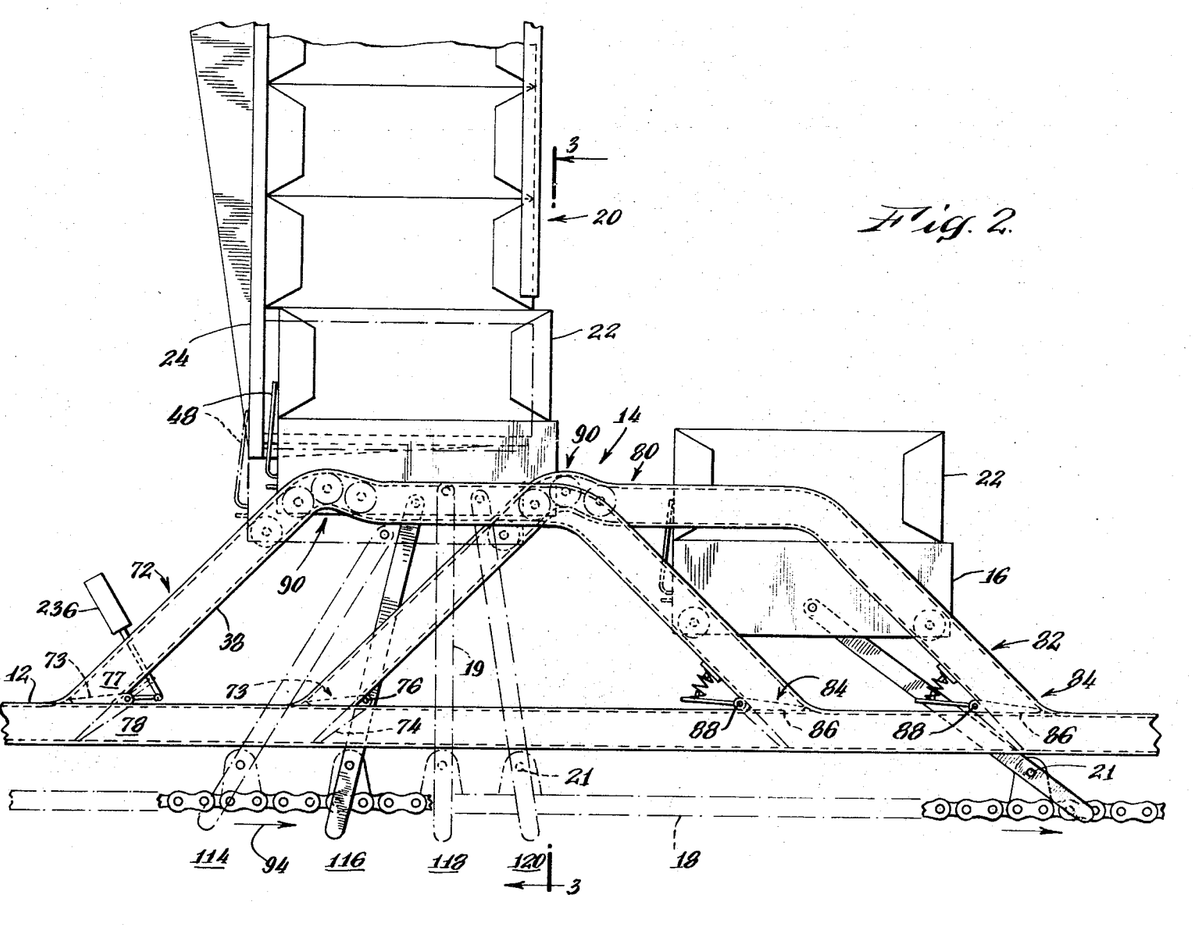
FIG. 2 is a side view in elevation of an article supply station and illustrates various orientations of a drive link employed in the control of an article carrier during its movement on a side track located opposite the supply station.

FIG. 2 illustrates a typical article supply station 20. A side track 14 is shown rising along upwardly inclined side tracks 72 (of like channel design as track 12) to an elevation above main tracks 12 selected to enable some carriers to pass below the supply station as well as to bring carriers into operative article pick up relationship with article storing chute 24. The upwardly inclined tracks 72 are formed of four parallel inclined extensions of channels 36, 36', 38 and 38' (with only inner front wheel channel extension 36 and outer rear wheel channel extension 38 being visible in the view of FIG. 2). Upwardly inclined tracks 72 are operatively connected with channel switches 73 to the main track channels. Switches 73 are formed of levers 74 located in channels of tracks 14. Levers 74 are pivotly mounted to tracks 14 and pivot in a vertical plane about a pivot axis 76. Levers 74 are normally pivoted in an up position such as at 77 unless actuated to pivot down to a position as at 78 to direct the wheel of the carrier running in that channel up along inclined tracks 72. A lever 74 is located in each channel at a side track 14 and synchronously operated by suitable actuation means 236, for example such as controlled solenoids (FIG. 2). The employment of individual channels for each carrier wheel 35 and a lever 74 for each channel advantageously assures proper directing of carriers 16 independent of their location along main track 12.

Tracks 72 operatively couple onto generally horizontally disposed track segments 80 which in turn operatively couple to downwardly inclined track segments 82. Track segments 82 operatively couple to main tracks 12 with normally upwardly pivoted track switches 84 located in each of the channels 36-36', 38-38'. Switches 84 are levers 86 pivoted at axes 88 located to pivot levers 86 in a vertical plane. Levers 86 are spring biased in an upward position to both permit unobstructed rapid carrier bypass motion along main track 12 as well as dampen vertical components of carriers moving along downwardly directed tracks 82 onto main track 12.

At the junction of the upwardly inclined side tracks 72 and the horizontally disposed track segments 80 toggle displacements 90 of side tracks 14 away from main tracks 12 and drive 18 are provided. These track displacements 90 are sized to provide a vertical orientation, as shown in FIG. 2 of drive link 19 and cause a rearward or counterclockwise orientation reversal thereof as drive mechanism 18 continues to move the main track located pivot 21 of drive link 19 in the direction indicated by arrow 94.

Figure 3:
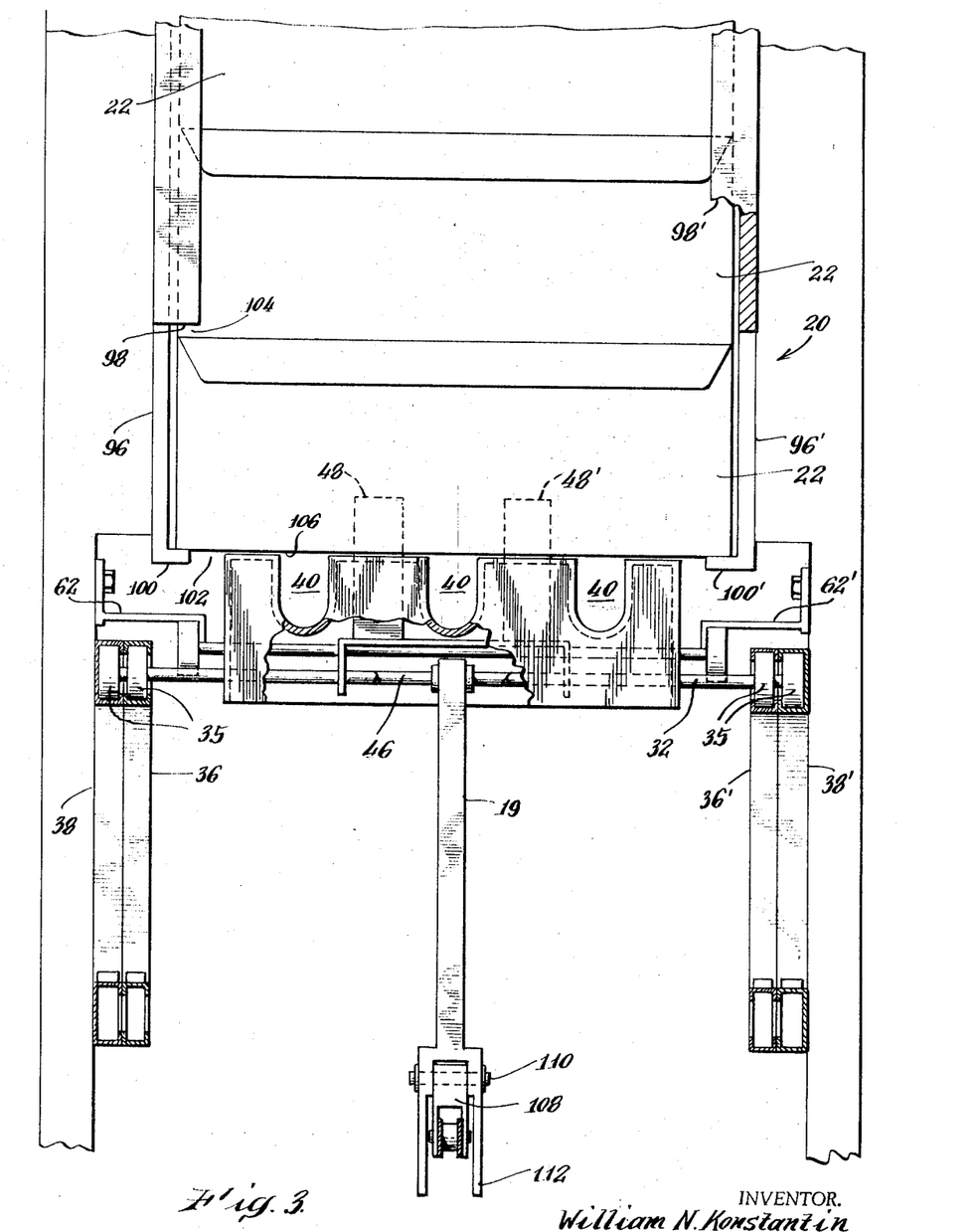
FIG. 3 is a view of the conveyor system at a supply station taken along the direction of motion of a carrier located on a side track as seen along the line 3—3 in FIG. 2.

As shown in FIG. 3, article supply station 20 is formed with a vertically disposed chute 24. Chute 24 has sides 96-96' provided with front flanges 98-98' to retain articles 22 in the form of boxes. Chute 24 bottoms above side track 14 with bottom article support flanges 100-100' spaced from a carrier receiving port 102 sized to freely receive carriers and still provide vertical support of articles. Front flanges 98-98' terminate above side track 14 and bottom flanges 100-100' to form an article removal port 104 in chute 24. In the apparatus shown in FIG. 3 carrier 16 is located with wheels 35 at the drive link toggling position in side track displacements 90 as is evidenced by the space 106 between the bottom of box article 22 and the top of the carrier. Drive link 19 is shown connected to drive mechanism 18 by means of a chain mounted bracket 108 and a pivot shaft 110. Drive link 19 continues with a toggle segment 112 beyond pivot shaft 110 for a distance desired for link toggling prior to entering side tracks 14 opposite article supply station 20.

In the operation of a quickly moving conveyor system 10 careful and accurate handling of articles is desired. For this reason orientation of drive link 19 is controlled with respect to the direction of motion of carriers on side tracks 14 opposite supply stations.

Prior to engagement of a carrier 16 with an article supply station 20, the drive link 19 associated with that carrier is oriented as shown at 114 (FIG. 2) to push the carrier up inclined tracks 72. The upward motion by carrier 16 is accompanied with a vertically pivoting (counterclockwise) of drive link 19 as shown in FIG. 2 between its operative positions 114 and 116. This vertical motion of link pivot is accompanied with a partial slow down of carrier forward motion. As the carrier 16 approaches its article engaging position, drive link 19 is selected to be in the vicinity of its upright position 118. Following engagement of an article 22 link 19 has been toggled through its vertical orientation at 118 to an inclined orientation as at position 120. Link 19 now is oriented to pull carrier 16 down tracks 82 and to an article delivery station 26.

The effect of the drive link toggling motion is to retard the forward motion of carrier 16 even though drive mechanism 18 is continuously rapidly moving in the direction indicated by arrow 94. The displacement of side tracks 14 from main tracks 12 thus enhances the careful yet rapid handling of articles by the conveyor system. The length of links 19 and the displacement of horizontally disposed track segments 100 from the main track 12 are also selected commensurate with the desired carrier slowdown. The longer link 19 the greater the effected retardation of carrier 16.

As carrier 16 engages an article 22 resting on bottom support flanges 100–100' the carrier mounted arms 48 engage it and effectively snare the article from its place within chute 24. Continued motion of carrier 16 is accompanied with a sliding withdrawal of article 22 through the article removal port 104. Forward motion of carrier 16 gradually increases as it descends along tracks 82 until carrier 16 proceeds forwardly at the same speed as drive mechanism 18 when carrier has again engaged main track 12 and is moved to a delivery station 26.

Figure 7:
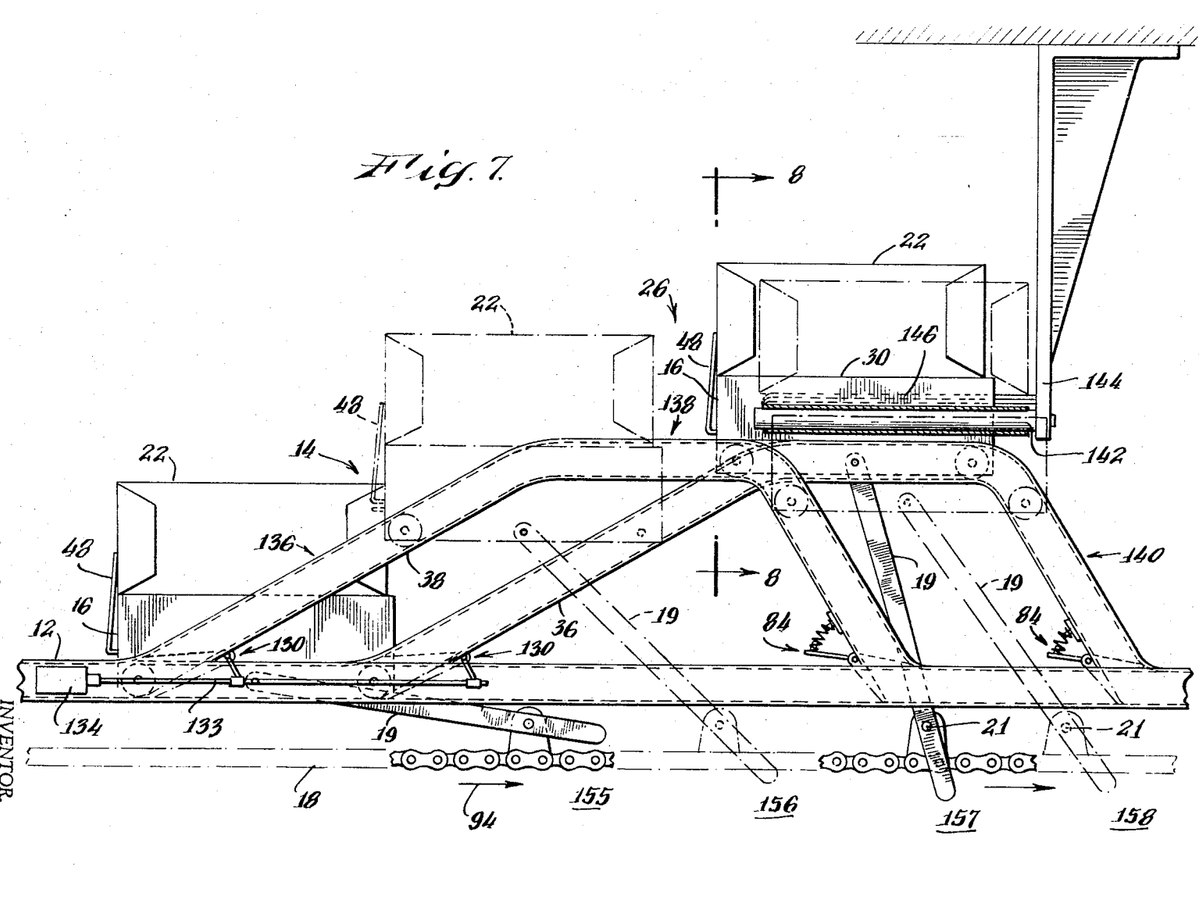
FIG. 7 is a side view in elevation of a side track and an article delivery station for unloading articles with a carrier illustrated in several operative positions at this station.

FIG. 7 illustrates an article delivery station 26 wherein a carrier is elevated onto a side track 14 after actuation of track located switches 130. As shown track switches 130 are operable in adjacent front and rear wheel channels and actuated by a common control rod 133 operatively connected to a solenoid 134. Switches 130 operatively interconnect the main track 12 with an upwardly inclined track 136 leading to a horizontally disposed track 138. A track 140 interconnects horizontal track 138 downwardly to main track 12 with spring biased track switches 84.

Vertically spaced above horizontally disposed track 138 is an article unloading platform 142 suspended by a bracket 144. Article unloading platform 142 is formed of several freely rotating article pickup fingers or rods such as 146 sized and shaped to fit with clearance in slots 40 in the article carrier platform 30. Rods 146 are mounted in cantilever fashion to bracket 144 and extend in a direction opposite to carrier motion. The vertical spacing as seen in FIG. 7, between rods 146 and track 138 is such that rods 146 may freely enter platform slots 40 (FIG. 8) of an arriving carrier below the article being delivered by the carrier. The position of article unloading platform 142 is so selected that article 22 cannot be squeezed between arms 48 and bracket 144 as the carrier proceeds along side track 14. In effect carrier arm 48 will quickly drop below article unloading platform 142 as the carrier dips towards main track 12 along track 140.

FIG. 8 illustrates a side view of delivery station 26 with rods 146 shown aligned along a slight incline as indicated by line 148. Articles 22 deposited by carriers on rods 146 roll down the incline onto an endless conveyor belt 150 which delivers articles onto a stationary collection platform 152.

The operation of article delivery station 26 is as follows with reference to FIGS. 7 and 8. Carriers 16 with articles located on their platforms are routed by remote controlled track switches 130 onto upwardly inclined track 136 under the pulling action from drive link 19. As the carrier is moving along the horizontal track 138 towards the article depository, rods 146 enter the front end 42 of carrier platform slots 40 but below article 22. As the carrier proceeds it leaves track 138 and enters track 140 which causes, by its sharp incline, a rapid descent of carrier 16. Rapid carrier descent clears arms 48 from article 22 which remains on the rods 146. The inclined orientation of rods 146 and their rotatability causes the now deposited article to roll onto conveyor 150 which in turn delivers article 22 onto stationary collection platform 152. The now empty carrier leaves delivery station 26 and re-enters main track 12. Since drive link 19 is now oriented to pull carrier 16 along main track 12, a re-toggling station 254 (See FIG. 18) is provided along the return path of main track 12 to an article supply station 20. Drive link and article carrier positions on the side track opposite delivery station 26 are shown in operative sequence at 155, 156, 157 and 158. Re-toggling of link 19 at station 154 is accomplished in a similar manner as described with reference to an article supply station 20.

Figures 9, 10, 12, 13:
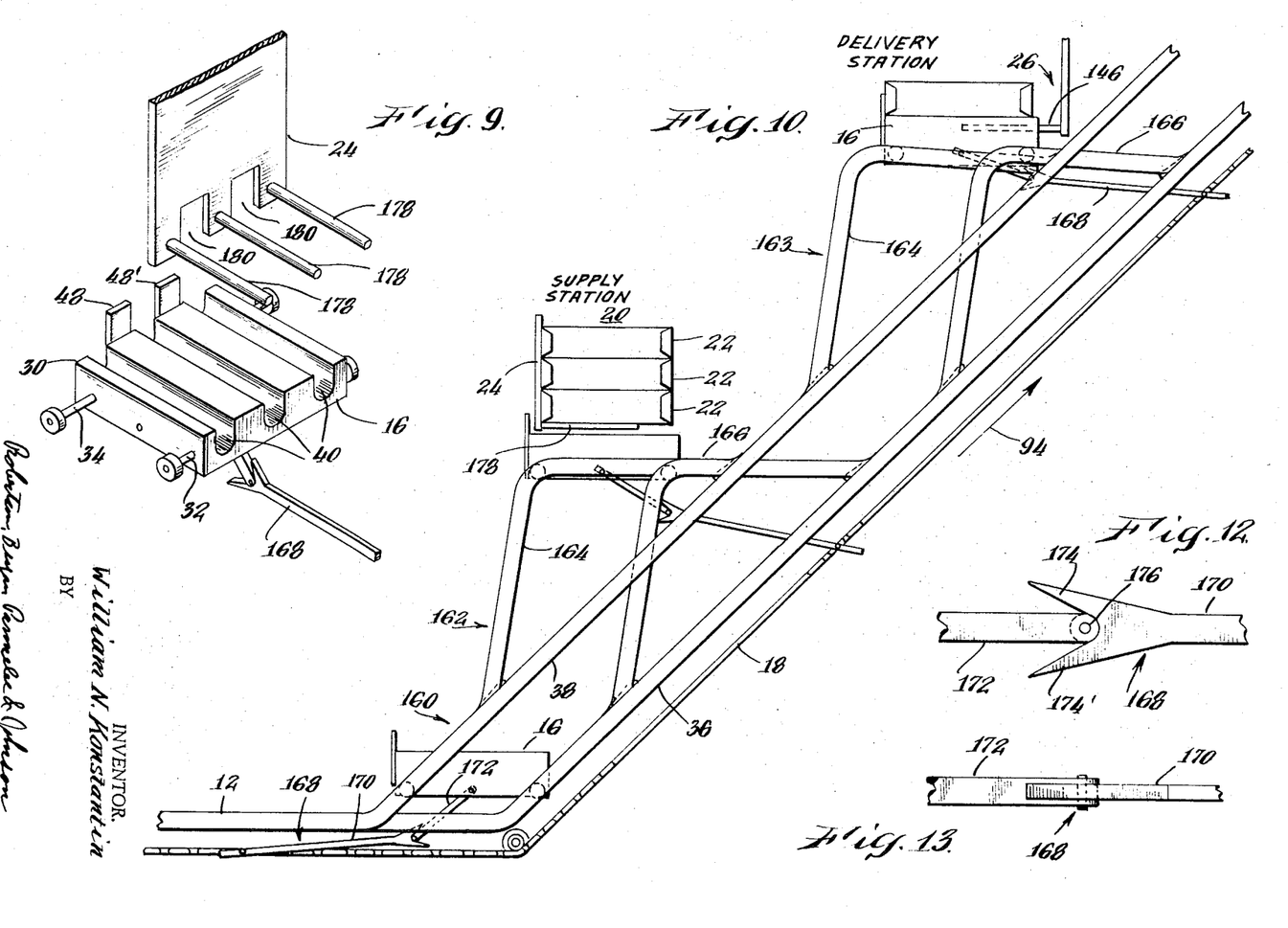
FIG. 9 is a perspective view of a carrier and an article handling mechanism utilized at supply and article delivery stations in an inclined and vertically oriented conveyor system respectively shown in FIG. 10 and 11.
FIG. 10 is a side view in elevation of a conveyor system arranged along an incline.
FIG. 12 is a partial side view of a multiple part link utilized in the transportation of carriers along main and side tracks in conveyor systems shown in FIGS. 10 and 11.
FIG. 13 is a top view of the link shown in FIG. 12.
Figures 11, 14:
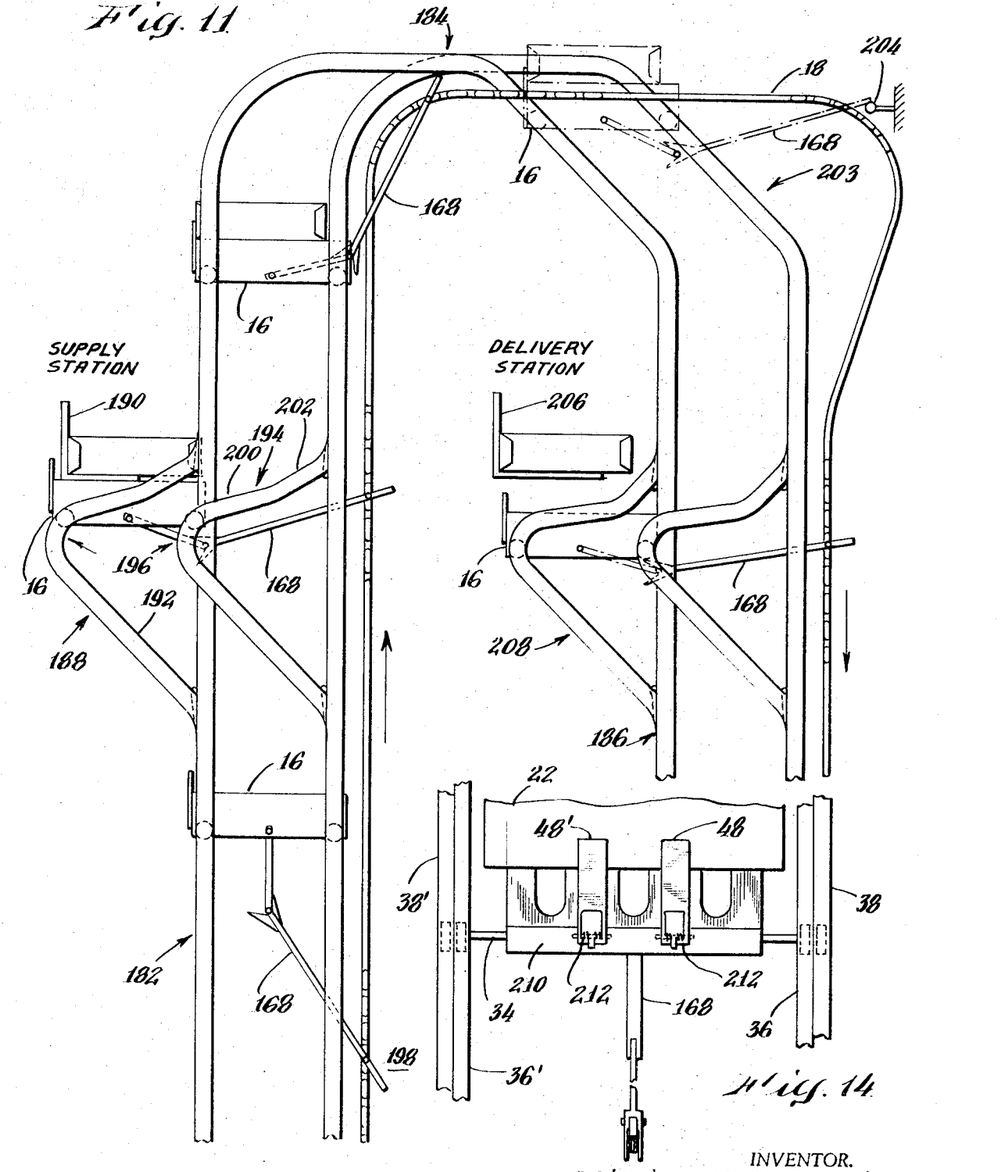
FIG. 11 is a partial view in elevation of a vertically arranged conveyor system.
FIG. 14 is a rear view of a carrier having a spring-biased article snaring mechanism.

The conveyor system may include vertical or inclined main tracks as illustrated in the embodiments of FIGS. 10 and 11.

In FIG. 10 the conveyor system main track 12 slants upwardly along an inclined main track 160. The inclined main track is formed of four parallel track channels, 36–36' for front carrier wheels (only 36 being visible in FIG. 11) and 38–38' for rear carrier wheels (only 38 being visible in the view of FIG. 11).

Side tracks 162 are shown displaced from main track 160. For illustrative purposes an article supply station 20 is shown opposite a first side track 162 and an article delivery station 26 opposite a second side track 163.

Side tracks 162 are formed of a first track segment 164 inclined with respect to main track 160 and extending to article supply station 20 where track 164 interconnects with a second track segment 166. Track 166 rejoins main track 160 at an angle thereto although track segment 166 is generally horizontal.

Carriers 16 are shown driven by chain drive 18 along the main tracks 12 and 160. A drive link 168 is employed to advance carriers along the tracks. Drive link 168 is formed of two pivotly connected link segments 170–178 for enhanced carrier maneuver ability and are respectively coupled to the carrier 16 and to the chain drive 18 in a manner like link 19.

Link segments 170–172 are pivotly connected to one another as illustrated in FIGS. 12 and 13. Link segment 172 is shown terminating with outwardly flared portions serving as pivot stops 174–174' for link segment 170. Link segment 170 pivotly engages link segment 172 with a pivot shaft 176 located midway between pivot stops 174.

Supply station 20 in FIG. 10 is substantially like that shown in FIG. 2 except for the design of chute 24 at its bottom end. As illustrated in FIG. 9, chute 24 in FIG. 10 is provided with article support fingers 178 mounted in cantilever fashion thereto. Chute 24 is further provided with selectively spaced recesses 180 (FIG. 9) located between fingers 178. Recesses 180 and fingers 178 are spaced in correspondence with the arms 48 and slots or recesses 40 of carrier platform 30 so that horizontal motion of carrier 16 along track 140 produces a meshing engagement of carrier 16 with chute fingers 178 resulting in a removal of articles 22 from supply station 20.

The junction between first side track 164 and second side track 166 is so selected that its spacing from main track 160 provides a toggling action of drive link 168, i.e. from a carrier pushing orientation prior to supply station 20 followed by a carrier pulling orientation after picking up an article 22.

Delivery station 26 is similar to that shown in FIG. 7. Track 166 at station 26, however, is but slightly downwardly inclined relative to the cantilever mounted rods 146.

FIG. 11 illustrates a vertically disposed conveyor main track 180 composed of a vertical main track 182 for upward moving carriers, a lateral main track 184 for side motion of carriers and a vertically oriented main track 186 for downwardly traveling carriers. A first side track 188 is provided to bring carriers in operative contact with single article carrying supply stations 190. Side track 188 is formed of first and second side track segments 192–194 which join each other at a junction 196. Junction 196 is selectively spaced from main track 182 so that drive link 168 may be toggled from a pushing orientation such as at 198 to a pulling orientation accompanied with a slow down of carrier 16 opposite station 190. Side track segment 194 is slightly vertically inclined. This imposes a vertical component on carrier motion as a carrier removes an article from station 190. By selectively partitioning track segment 194 into differently vertically inclined sections 200–202 vertical motion of carriers in the vicinity of station 190 is mainly carried out on section 202, away from station 190. In this manner unobstructed carrier movement past station 190 is accomplished.

Retoggling of drive link 168 to a carrier pushing orientation is obtained at the junction 203 of lateral main track 184 and vertical main track 186. In this instance drive mechanism 18 is displaced from the main tracks in order to extend drive link 168. When toggle segment 112 (such as seen in FIG. 3) of drive link 168 encounters stationary pin 204 at junction 203, drive link 168 is pivoted into a pushing orientation.

A delivery station 206 is located opposite a side track 208 which is like side track 188 but displaced from vertical main track 186.

The carrier 16 in use with the vertical conveyor track as in FIG. 11 may employ an alternate article snaring arrangement as shown in FIG. 14. Carrier 16 as shown in FIG. 14 is provided with arms 48 extending upwardly from a slotted plate 210. Plate 210 is pivotly mounted to carrier 16, and is spring loaded in an upright orientation by springs 212.

In the system as shown in FIG. 2 the link 19 is swung from a position in which the link is pushing the carrier, i.e. the link is leading its point of connection 21 to the drive line or chain 18, to a position in which the link is trailing its point of connection 21. This swinging movement of the link relative to the drive line 18 allows the carrier to decelerate momentarily to pick up the article smoothly from the supply station even though the drive line continues moving at a uniform speed.

As an alternative, the link 19 can remain in a trailing relationship at all times relative to its point of connection 21 to the drive line 18. In order to decelerate the carrier, the link 19 is moved from a position in which it somewhat trails the connection point 21 to a position in which it further trails the connection point 21.

In the systems as described above the supply and delivery stations are widely separated from each other. It is to be noted that in certain instances the supply and delivery stations may be associated with the same side track or path. In such a system the supply station is located near the beginning of the straight segment of the side track and the delivery station is located nearer the end of the straight segment of side track. If desired the same article support can be used to provide the supply and delivery stations by utilizing a movable support which is shifted back and forth, depending upon whether it is to perform a supply or delivery function.

In certain systems the link 19 may be made extensible by utilizing a hollow tubular telescoping link surrounding a tension spring which normally urges the link into its retracted condition.

With respect to FIG. 8, it is to be noted that the unloading platform 142 defined by the rod rollers 146 is arranged to provide an effective downward inclination toward the conveyor belt 150, i.e. toward the right in FIG. 8. In order to provide the capability of shunting the articles off to the left or right this platform 142 is pivotably mounted on its bracket 144 (FIG. 7) so that the rod rollers 146 can be inclined downwardly toward the right or left.

Figures 15, 16, 17:
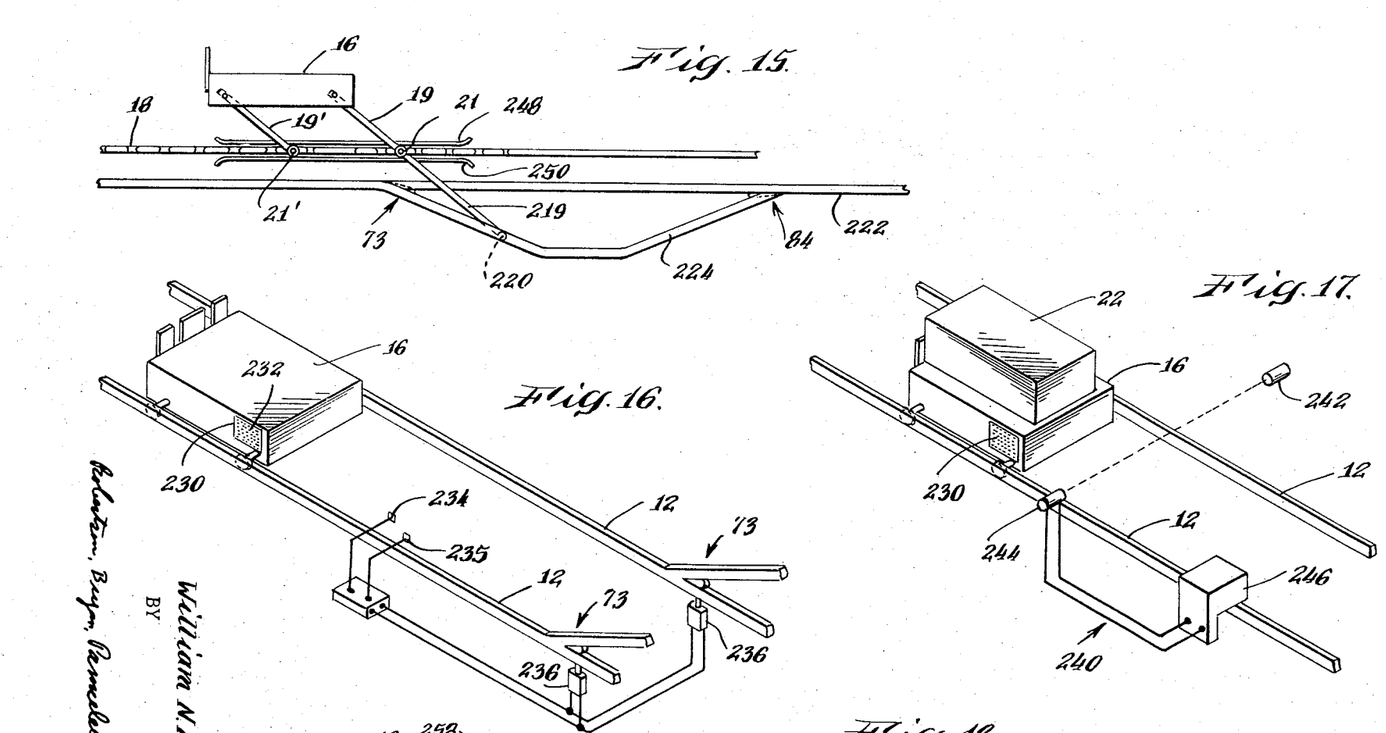
FIG. 15 shows a parallelogram position control linkage connecting the carrier to the drive chain.
FIG. 16 shows a carrier having control means mounted thereon to be scanned by a sensing unit preceding the respective delivery stations.
FIG. 17 shows automatic verification apparatus for making sure that the carrier has actually picked up the desired object.

In the automatic system as shown in FIG. 15 the linkage connecting the carrier 16 and the drive line or chain 18 is a parallelogram linkage including the control link 19 and a slave link 19'. These links are connected to the drive line 18 by pivots 21 and 21', respectively, and their attitude with respect to the line 18 is controlled by an extension 219 of the link 19 having a cam follower roller 220 which is captured within and travels along a main cam track 222. This main track has associated side tracks, such as shown at 224. A switch 73, such as shown in greater detail in FIG. 2, serves to direct the cam follower 220 into the side track 224 when it is desired to divert the carrier 16 away from its main path into an alternate path passing adjacent to a supply or delivery station, as the case may be.

In order to control the operation of the automatic systems as described above, each carrier 16 has control means 230 mounted thereon in the form of a magnetizable rectangular plaque adapted to have predetermined patterns of magnetized dots recorded thereon. This recording is accomplished by a matrix of magnetic recording heads. The recorded data on the control means 230 identifies the respective supply stations from which the respective carriers are intended to receive their respective articles. These magnetized dots 232 are sensed by pairs of sensing units 234 and 235 which precede the respective delivery stations. The sensing units 234 are connected to actuating means 236 for operating the switches 73 (FIG. 2).

As shown in FIG. 17, the system may advantageously include verification and identification means 240 including a light source 242 and a photocell 244 for sensing the presence of an article 22 on the carrier 16 when the article interrupts the light beam. The verification and identification means 240 also includes a matrix 246 of sensing units which senses the control data 232 on the carrier 16 to identify the station from which a carrier has failed to pick up an article in the event that an article is found to be absent from the carrier.

Directing attention to FIG. 16, it is noted that the magnetized dots 232 are arranged in colums and rows. The rows extend parallel to the direction of movement of the carrier 16 as it moves along its guide tracks 12. The columns of these dots extend at an angle to the direction of movement, e.g. they may extend perpendicularly thereto, but not necessarily so.

The respective magnetic sensing heads 234 and 235 are positioned relative to the path of the carrier 16, such that the sensing head 234 scans one row of these magnetic marks while the other head 235 scans a different row. Moreover, the scanning heads 234 and 235 are positioned in a particular spatial configuration relative to one another which is specifically distinct for each station. When these scanning heads 234 and 235 simultaneously sense magnetic marks, they trigger the operation of the actuation means 236.

With respect to the systems of FIGS. 1 and 15, it is to be noted that the side paths into which the carriers 16 are diverted may lie in the same horizontal plane as the main path along which the carriers normally proceed. Among the advantages of this horizontal co-planar arrangement of the main and side paths is that it enables relatively tall articles to be handled conveniently because the respective hoppers are laterally displaced and do not represent an overhead obstacle relative to the main path along which the loaded carriers proceed.

With respect to the system of FIG. 15, it will be appreciated that the parallelogram linkage enables the positions of the carriers 16 to spatially be determined without running the carriers themselves along tracks. In order to accomplish this the drive line or chain 18 is guided by means of a channel defined by opposing guides 248 and 250 extending along beside the drive line 18. A pair of drive lines 18 extending parallel to each other and a pair of parallelogram linkages connected to opposite sides of the carrier may be used to advantage for this purpose.

Figure 18:
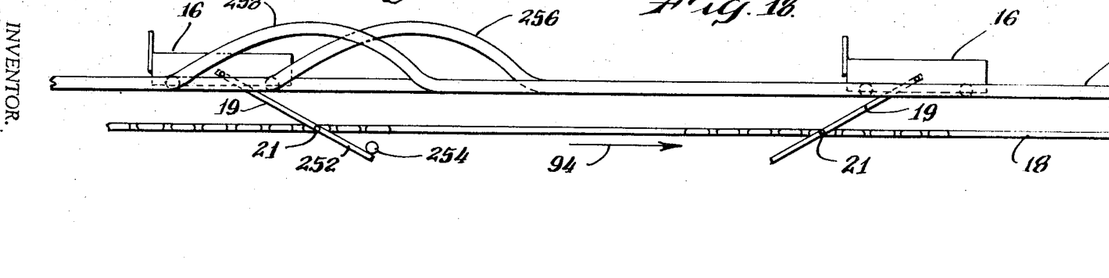
FIG. 18 shows the manner in which the drive linkage is swung from a trailing into a leading orientation.

As shown in FIG. 18, the manner in which the link 19 is moved from trailing to leading orientation is to provide the link with a portion 252 extending beyond the pivot 21. This extending leg 252 engages against a fixed pin 254, causing the link and carrier to be swung ahead. The tracks for the front and rear wheels include curved segments 256 and 258 to accommodate the forward surging movement of the carrier and its wheels.

As indicated previously, the automatic conveyor systems described above can be used to advantage to accomplish sorting of numerous articles. For example, in using a system as shown in FIG. 16 in which the control data is transmitted by the respective carriers themselves, an operator takes a mass of different articles to be sorted and places them one at a time in a pick-up station. The operator also punches a keyboard to encode on the respective carriers the destination data for the respective different articles. Thus, the system sorts the articles by carrying and delivering each one to its desired destination.

In some cases the sorting system includes sub-systems which extend off on either or both sides of the main system. In such cases, the conveyor belt 150 (FIG. 8) serves to transfer the article onto a pick-up station of the sub-system. In order to control the operation of the sub-system, the data is transferred from the plaque 230 on a carrier of the main system to a similar plaque on a carrier of the sub-system. When the sub-systems extend out on opposite sides, then the platform 142 is arranged to be tilted toward either side as described further above.

What is claimed is:

1. A system for automatically collecting, sorting and distributing articles comprising a closed loop track, article carriers mounted for movement on the track, means for driving said carriers along the closed loop track, each of said carriers being provided with a platform for receiving and supporting an article for handling, article supply and delivery stations located along the track, with each of said article supply and delivery stations being provided with cantilever mounted article support means providing clearance along the direction of motion of carriers and sized to mesh fit said platform, said article support means being so spaced from the track supported carriers to meshingly engage said platform for interchanging the article between the stations and the carrier during carrier movement along said track, said carriers being provided with article engaging means movably mounted on the carriers to be moved upwardly and downwardly in height with respect to said platform, said carriers also having a control member for controlling the height of said article engaging means, and selected article supply stations being provided with cam means engaged by said control member for controlling the height of said article engaging means for selectively collecting articles by moving them off from the support means of selected article supply stations.

2. The system for automatically collecting, sorting and distributing articles as claimed in claim 1, wherein said article engaging means comprises aft located article snaring arms movably mounted on said carrier, spring means urging said snaring arms to extend upwardly above the platforms, said cam means serving to depress said snaring arms for a predetermined distance for selectively engaging an individual article held by said support means and for moving the individual article off from said support means.

3. The article handling system as claimed in claim 1 wherein said track is formed of main and side tracks, said article supply and delivery stations being spaced opposite said side tracks, with said side track displaced from the main track to enable article handling engagement of carriers at said side tracks, and wherein said drive means includes a drive link pivotly mounted to the carriers.

4. The article handling system as claimed in claim 3 wherein said main track is disposed along an incline with said side tracks being displaced therefrom and formed of generally vertically and horizontally disposed track segments, said generally horizontal track segments being located opposite article supply and delivery stations.

5. A system for automatically collecting, sorting and distributing articles comprising a closed loop track, article carriers mounted for movement on the track, means for driving said carriers along the closed loop track, each of said carriers being provided with a platform for receiving and supporting an article for handling, article supply and delivery stations located along the track, with each of said article supply and delivery stations being provided with cantilever mounted article support means providing clearance along the direction of motion of carriers and sized to mesh fit said platform, said article support means being so spaced from the track supported carriers to meshingly engage said platform for interchanging the article between the stations and the carrier during carrier movement along said track, said carriers being provided with aft located article snaring arms extending upwardly above the platforms for a predetermined distance for engaging an article held by said support means and for moving the article off from said support means, said article snaring arms being vertically adjustably mounted on the carriers, and selected article supply stations being provided with cam means for operatively controlling the upward extension of said arms above the carrier platform.

6. The article handling system as claimed in claim 5 wherein said article snaring arms are provided with generally horizontal lever arms pivotly mounted to the carrier at a frontal location thereon, and a cam follower shaft connected to the lever arms at a location rearward of said pivot and protruding to terminate in a position opposite the cam means, and cam follower rolling elements mounted on the cam follower shaft for operatively engaging said cam means.

7. The article handling system as claimed in claim 6 wherein said cam means includes at least one cam bracket vertically adjustably mounted to the supply station, said adjustable cam bracket having a cam surface arranged to depress said cam follower rolling element and extending horizontally generally for the length of said supply station mounted article support fingers.

8. A system for automatically collecting, sorting and distributing articles comprising a closed loop track, article carriers mounted for movement on the track, means for driving said carriers along the closed loop track, each of said carriers being provided with a platform for receiving and supporting an article for handling, article supply and delivery stations located along the track, with each of said article supply and delivery stations being provided with cantilever mounted article support means providing clearance along the direction of motion of carriers and sized to mesh fit said platform, said article support means being so spaced from the track supported carriers to meshingly engage said platform for interchanging the article between the stations and the carrier during carrier movement along said track, said track being formed of main and side tracks said article supply and delivery stations being spaced opposite said side tracks, with said side tracks displaced from the main track to enable article handling engagement of carriers at said side tracks, said drive means including a drive link pivotally mounted to the carriers, and said main track being horizontally disposed and formed of spaced pairs of rear and front wheel channels, with said carriers provided with front and rear wheels located in said channels.

9. The article handling system as claimed in claim 8 wherein said main track is vertically disposed.

10. The article handling system as claimed in claim 8 and further including means for controlling the orientation of said carrier drive links for speed control of said carriers at selected locations.

11. A system for automatically fetching different merchandise articles located at supply stations and collecting the fetched articles at a delivery station comprising main tracks and article carriers moving on said tracks, said main tracks being routed opposite supply and delivery stations to bring carriers respectively in article pickup and delivery position therewith, continuously moving drive means located along the main track, pivotally mounted links interconnecting each carrier with the drive means to move said carriers along the main track, each of said links being pivotally mounted to both said carriers and the drive means, side tracks extending from the main tracks to selectively locate carriers operatively opposite article pickup and delivery stations, said side tracks being displaced from the drive means a distance commensurate with the length of a link to provide a common drive for each of said carriers during pickup and delivery of articles, said carriers each being provided with a slotted article carrying platform with platform slots arranged parallel with the direction of movement of the carriers, and said selected stations being provided with article engaging members sized and located adjacent side tracks to mesh within said slots for article manipulation with respect to the slotted carrier article platform.

12. A conveyor system for automatically fetching different articles at supply stations and collecting the fetched articles at a delivery station comprising a main track, carriers mounted on the main track for movement therealong, side tracks operatively and controllably coupled to the main tracks for guiding carriers to and from article supply and delivery stations, article supply and delivery stations, with article supply stations being provided with article storing chutes, said chutes terminating with predetermined clearance spacing above carriers located on side tracks, said chutes having carrier entering and departure ports with the departure port sized to accommodate an article removed from the stack, continuously moving drive means located along the main track, pivotally mounted links interconnecting each carrier with the drive means to move said carriers along the main track, said links being sized to accommodate with pivot motion the movement of a carrier along a side track below an article storing chute, and means for controlling the orientation of the links at said side track relative to the direction of motion of carriers to provided reduced carrier motion in the vicinity of the chute.

13. The conveyor system as claimed in claim 12 wherein the side tracks are provided with a preselected displacement away from the drive means in the vicinity of the chute to effect a toggle action of links connected to carriers located on the side tracks with reduced motion of a carrier near a chute.

14. A system for automatically collecting, sorting and distributing articles comprising a drive line movable along a main path, a multiplicity of carriers, said carriers being connected to spaced points along said drive line by respective linkages thereby to propel said carriers along said main path, at least one supply station and at least one delivery station positioned along said main path, means for holding at least one article at the supply station, means for temporarily diverting a pre-selected one of said carriers from said main path into a first alternate path passing adjacent to said holding means for transferring the article from said holding means to said pre-selected carrier, said pre-selected carrier thereafter returning to the main path, other means for temporarily diverting said pre-selected carrier from the main path into a second alternate path passing adjacent to said delivery station, and means for receiving the article from the pre-selected carrier at said delivery station.

15. A system for automatically collecting, sorting and distributing articles as claimed in claim 14 in which the system includes multiple supply stations and provides verification that an article has been picked up and identifies the station from which it should have been picked up wherein each of said carriers has control means mounted thereon adapted to contain the control data for operating the system, sensing means associated with the respective supply stations for sensing the control data on the respective carriers actuating means associated with the respective supply stations controlled by the respective sensing means for causing pre-selected carriers to pick up respective articles from respective supply stations, and verification and identification means for sensing the presence of an article on the respective carriers and for sensing the control data on the respective carriers to identify the station from which a carrier has failed to pick up an article in the event that the article is absent from that carrier.

16. A system for automatically collecting, sorting and distributing articles as claimed in claim 14 in which said linkages interconnecting said carriers and said drive line are parallelogram linkages and the system includes means for controlling the orientation of said parallelogram linkages with respect to said drive line.

* * * * *